United States Patent [19]

Takata et al.

[11] Patent Number: 4,801,041

[45] Date of Patent: Jan. 31, 1989

[54] EASILY-OPENABLE PACKAGING CONTAINER AND LID FOR THE SAME

[75] Inventors: Yukio Takata; Takeshi Shinohara, both of Himeji, Japan

[73] Assignee: Idemitsu Petrochemical Co., Ltd., Tokyo, Japan

[21] Appl. No.: 102,648

[22] Filed: Sep. 30, 1987

[30] Foreign Application Priority Data

Sep. 30, 1986 [JP] Japan .............................. 61-229594
Feb. 27, 1987 [JP] Japan .............................. 62-42794

[51] Int. Cl.$^4$ .............................................. B65D 41/00
[52] U.S. Cl. ................................... 220/359; 220/270; 220/260
[58] Field of Search ................. 220/270, 359, 260; 215/233; 229/43

[56] References Cited

U.S. PATENT DOCUMENTS 4,280,653 7/1981 Elias ..................................... 220/359
4,693,390 9/1987 Hekal ................................... 220/359

*Primary Examiner*—George T. Hall
*Attorney, Agent, or Firm*—Antonelli, Terry & Wands

[57] ABSTRACT

An easily-openable packaging container comprises a container body and a multilayer lid member heat-sealed at the flange portion of the container body, in which the multilayer lid member has an interlaminar strength smaller than the adhesion strength between said flange portion and the inner layer of the multilayer lid member so that the multilayer lid member can be delaminated at a portion corresponding to the heat-seal portion at the time of opening, and a means for circularly peeling the inner layer of the miltilayer lid member from the outer edge of the heat-seal portion to the inner edge or inner vicinity of the heat-seal portion is provided.

The easily-openable packaging container has both excellent sealing property and easy openability and can be opened with a stable opening force.

11 Claims, 3 Drawing Sheets

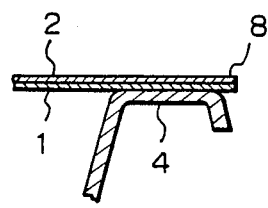
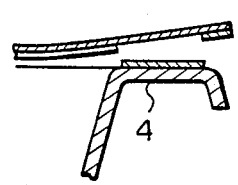
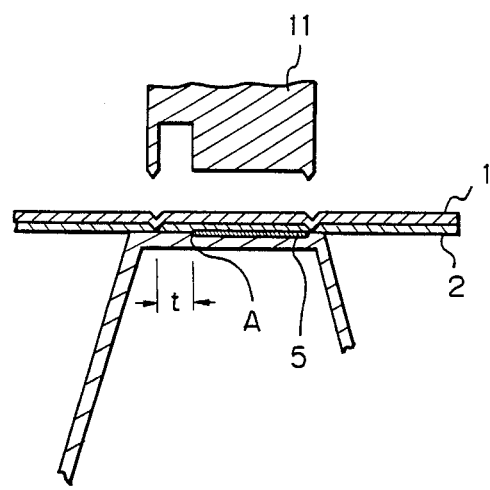

EASILY-OPENABLE PACKAGING CONTAINER AND LID FOR THE SAME

BACKGROUND OF THE INVENTION (1) Field of the Invention

The present invention relates to easily-openable packaging containers and lids for the same. Particularly, the present invention relates to easily-openable packaging containers and lids for the same that have excellent sealing property since the lid members thereof can be heat-sealed so strongly as to obtain high pressure resistance to the pressure inside the containers, and yet have excellent easy openability. The easily-openable packaging containers of the present invention are suitable for packaging foodstuffs, especially for heat sterilization packaging.

(2) Description of the Prior Art

Flanged containers have been widely used for packaging foodstuffs or the like, and the flanged containers have been sealed by heat-sealing a lid member thereto after a content is filled. However, thus produced heat-seal containers have a defect that, if the sealing property is improved by increasing the heat-seal strength, the openability is aggravated resulting in the necessity for an opening operation using an edged tool or the like and, on the other hand, if a material having a proper interlaminar strength is selected to improve the openability, a uniform interlaminar strength cannot be obtained resulting in a decrease of the seal properties since the sealing property varies broadly depending upon the heat-seal conditions, such as, temperature, pressure, and time, or owing to foreign matters such as the content sandwiched between the heat-seal surfaces. In the latter case, the containers are inapplicable to packages in which the internal pressure increases at the time of heating sterilization such as boiling or retort treatment. That is, the conventional hermetically sealed containers, which is to be opened by peeling the lid member at their heatseal surfaces, could not reconcile the antipodal objects, secure sealing and easy openability.

For solving these problems, a method of providing a ring notch to the under-lid of a multilayer lid for cutting the under-lid at the time of peeling the lid for the facility of peeling is described in Japanese Utility Model Laid-open No. 148,742/1978. However, the method is applicable only to containers to be provided with a partial and hole-like opening, and it is inapplicable to containers to be opened at whole opening portion thereof, since, in the method, the sealing property is provided by spacing out the notch and the outer edge of the under-lid, and a part of the under-lid outside the notch remains protruding inside the opening after the opening of the container. That is, the containers produced by the above described method have a problem that they are inapplicable to drinks or desserts to be directly eaten or drunk since the contents cannot be discharged readily.

SUMMARY OF THE INVENTION

An object of the present invention is to provide easily-openable packaging containers having both strong seal properties and easy openability, i.e. containers that have an excellent sealing property and a good peeling-opening property at the time of use and can be comfortably used since no lid remains at the opening of the container after opening.

Another object of the present invention is to provide lids that may be suitably used for producing the easily-openable packaging containers of the present invention.

In accordance with the present invention, there is provided an easily-openable packaging container comprising a container body and a multilayer lid member heat-sealed at the flange portion of said container body, in which said multilayer lid member has an interlaminar strength smaller than the adhesion strength between said flange portion and the inner layer of said multilayer lid member so that said multilayer lid member can be delaminated at a portion corresponding to the heat-seal portion at the time of opening, and a means for circularly peeling the inner layer of said multilayer lid member from the outer edge of said heat-seal portion to the inner edge or inner vicinity of said heat-seal portion is provided.

In accordance with the present invention, there is further provided a multilayer lid having an circular easily-peelable resin layer at a position where heat-seal with a container flange is to be conducted. The multilayer lid may be suitably used as the lid member of an easily-openable packaging container of the present invention.

BRIEF DESCRIPTION OF THE DRAWINGS

FIG. 5 is a partially sectional view of an easily-openable packaging container and a multilayer lid of the third embodiment of the present invention.

FIG. 6 is a partially sectional view illustrating a state where the easily-openable packaging container shown in FIG. 5 is being opened.

FIG. 7 is a partially sectional view of a specified seal ring and an easily-openable packaging container and a multilayer lid of the fourth embodiment according to the present invention sealed by the use of the seal ring.

DESCRIPTION OF THE PREFERRED EMBODIMENTS

Figure 1:
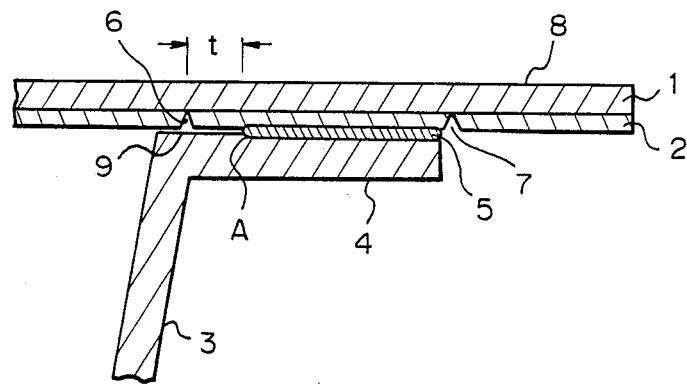
FIG. 1 is a partially sectional view of an easily-openable packaging container and a multilayer lid of an embodiment according to the present invention.

FIG. 1 is a partially sectional view of an easily-openable packaging container of an embodiment according to the present invention. Reference numerals (1, 2) represent a multilayer lid member, reference numeral 1 represents the outer layer of the lid member, and the reference numeral 2 represents the inner layer of the lid member. Reference numeral 3 represents a container body. Reference numeral 4 represents a flange portion. The container body 3 is covered with the multilayer lid (1, 2) after a content is filled thereto, and the container body 3 is then tightly heat-sealed with the multilayer lid (1, 2) at the flange portion 4. Reference numeral 5 represents a heat-seal portion, and the container body 3 and the multilayer lid is tighly heat-sealed at the flange portion of the container. Reference numeral 6 represents a cutting line for cutting the inner layer of the multilayer lid circularly at the inner vicinity of the heat-seal portion. Reference numeral 7 represents a cutting line provided to a picking portion 8. To the flange portion 4 is provided a non heat-seal portion 9 inside the heat-seal portion 5. The cutting line 6 is provided to the inner layer 2 of the multilayer lid above the non heat-seal portion 9. Between the inner edge A of the heat-seal portion and the cutting line 6, a space t of preferably 1 to 10 mm, more preferably 2 to 10 mm, is provided. When a lid member having such space t is peeled from the inside of the container, the stress concentrates to the point A and, therefore, the delamination from the cutting line 6 does not occur. Therefore, a peeling strength from the inside larger than that from the outside can be obtained resulting in an high pressure resistance and a good sealing property.

Concerning to the adhesion strength between the flange portion of the container body and the inner layer of the multilayer lid, it should be so strong as to provide tight sealing. The adhesion strength, therefore, is usually not less than 1.5 kg/15 mm (tension speed: 300 mm/min. This is to be repeated in the following.), preferably not less than 2.3 kg/15 mm. On the other hand, the interlaminar strength of the multilayer lid should be smaller than the adhesion strength between the flange portion of the container body and the inner layer of the multilayer lid so as to provide easy peelability. The interlaminar strength is usually not more than 1 kg/15 mm, preferably from 0.5 to 0.7 kg/15 mm.

In case of providing a non heat-seal portion, it may be provided by controlling the heat-seal area. Further, in order to adjust the length of t accurately, it is desirable to form a heat-nonfusible layer to the flange portion 4 of the container body or to the inner layer 2 of the multilayer lid inside the heat-seal portion 5 so that the sealing at this portion may be prevented. Also, it is desirable to provide a non heat-seal surface, i.e. a declined surface, a dropped surface, etc., to the inner periphery of the flange portion and provide the cutting line of the inner layer of the multilayer lid above thus formed non-flange plane. Thus, a uniform space can be provided between the inner edge of the heat-seal portion and the cutting line. This method considerably facilitates the operations of heat-seal. The material of the heat-nonfusible layer is not limited so long as it prevents the adhesion of the flange portion and the multilayer lid due to heat fusion at the time of heat-seal. Reference numeral 8 represents a picking portion for the facility of opening operation, which is formed by protruding a part of the lid member from the outer edge of the flange portion of the container body. Reference numeral 7 represents a cutting line provided to the inner layer of the lid member at the picking portion. It is provided so that the peeling of the inner layer of the multilayer may begin readily at the time of opening. This cutting line is not essential in the present invention.

Figure 2:
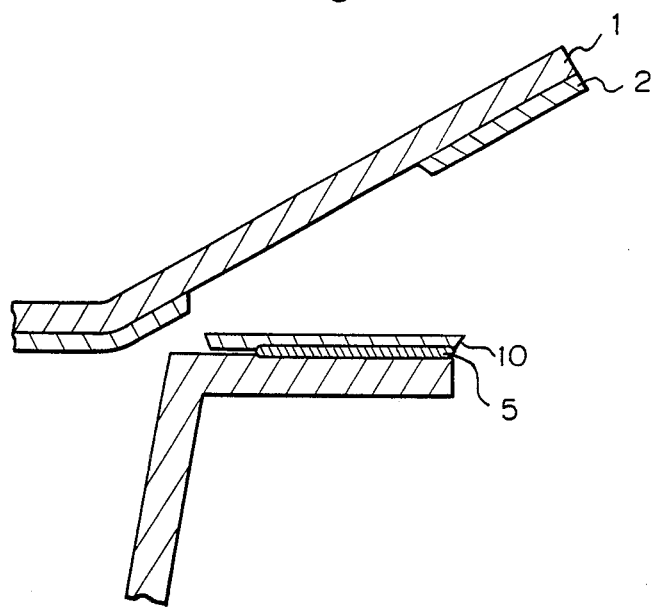
FIG. 2 is a partially sectional view illustrating a state where the easily-openable packaging container shown in FIG. 1 is being opened.

FIG. 2 is a partially sectional view illustrating a state wherein the container shown in FIG. 1 is being opened by peeling the multilayer lid heat-sealed to the container body. After the delamination of the multilayer lid occurred at the cutting line 7, the inner layer of the multilayer lid is cut at the cutting line 6 result in the peeling of the multilayer lid, and thus the container is opened. The inner layer of the multilayer lid between the cutting line 6 and cutting line 7 remains on the flange portion 4 of the container body as it adhered to the flange portion.

The multilayer lid of the present invention can be easily peeled even if it is tightly heat-sealed to the flange portion of a container body since it has a circular easily-peelable resin layer at a position where heat-seal with the container body is to be conducted.

In the present invention, a rib or curl may be provided to the outer periphery of the flange portion of the easily-openable packaging containers in order to increase the strength, rigidity, feeling at the time of using, etc. Since the easily-openable packaging containers of the present invention are opened by utilizing the delamination of the multilayer lid member, the lid member can be peeled with an ease similar to that in case of a container having a plane flange even if such reinforcing members are provided.

In the present invention, when the lid member is opened, the multilayer lid is delaminated at a portion corresponding to the heat-seal portion, and the peeled inner layer of the multilayer lid is circularly cut at the inner edge or the vicinity of the heat-seal portion resulting in the opening of the container. Usually, a cutting line is provided in order to cut the inner layer. It is preferable to provide the cutting line as a circular notch. However, the cutting line may be of any form so long as it can cut the inner layer of the multilayer lid easily when the multilayer lid is peeled. Also, the cutting line may extend into the layer adjacent to the inner layer (the outer layer in case of a two-layer structure) or only to a part of the thickness of the inner layer. Further, the cutting line may be provided circularly at the inner portion of the flange along the shape of the container body such as circle, triangle, quadrangle, etc., and also a part of the flange portion may be remained as it is. When a part of the multilayer is to be remained unpeeled, the part is remained not provided with a cutting line.

Figure 3:
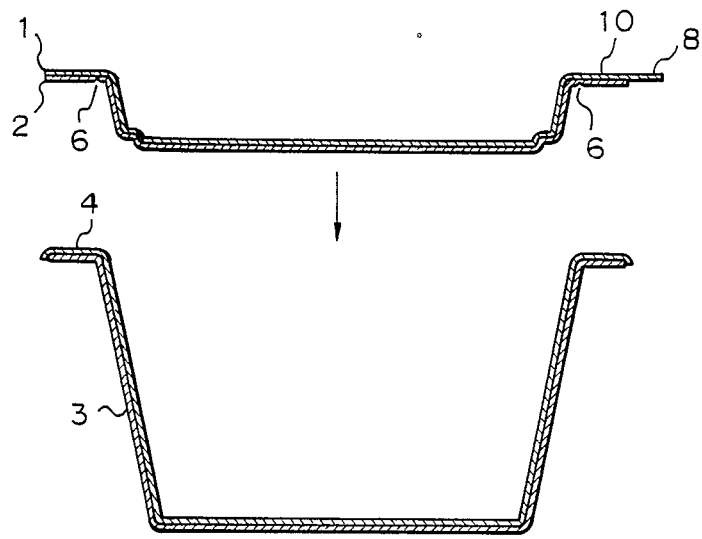
FIG. 3 is a sectional view of an easily-openable packaging container and a multilayer lid of another embodiment according to the present invention.

The examples of the methods of forming a cutting line include pressing with a heating ring, pressing with a ring blade, an ultrasonic treatment, cutting treatment with a cutting edge, laser treatment, a method using a shear caused by a shear force, a combination thereof, and the like. In case of a drop (concave) lid as shown in FIG. 3, the forming of the cutting line may be conducted simultaneously with the thermo-forming of the drop (concave) lid from a sheet, by the use of a mold having a circular sharp projection on its flange portion. Drop (conave) lids have another advantage that the space between the cutting line and the heat-seal portion can be secured and adjusted accurately. The cutting line is unessential so long as the peeled inner layer of the lid member can be cut circularly at the inner edge or the vicinity of the heat-seal portion at the time of opening. Therefore, the cutting of the peeled inner surface layer may also be caused by selecting the material of the inner layer (FIGS. 5, 6). Further, when the heat-seal is carried out by the use of the heat-seal ring 11 shown in FIG. 7 that has two portions projecting from the heat-seal plane at its both ends and has a non heat-seal surface between the inner projection and the heat-seal portion, the inner layer of the lid member is thinned at the inside and outside of the heat-sealed portion, and cutting is facilitated. Also, a lid member devoid of inner layer at the portion corresponding to the inside of the cutting line may be used.

The shape of the easily-openable packaging container is not to be limited, and, usually, it is circular, quadrangular, etc. Heat-seal is conducted circularly along the flange portion having the shape above described. Also, the container may be cup-shaped or tray-shaped.

Although the multilayer lid (1, 2) shown in FIG. 1 has a two-layer structure, the multilayer lids of the present invention may have either two-layer structure or a multilayer structure of more than two layers. The preferred multilayer lids are those comprising a substrate (outer layer) and a sealant layer (inner layer), the substrate consisting of a single layer film or multilayer film of a plastic; a paper; a metal foil such as an aluminum foil; or a composite material thereof, the sealant layer consisting of a polyethylene; a polypropylene; a polyester; a polycarbonate; a polystyrene; an ethylene-α-olefin copolymer; an ethylene-vinyl acetate copolymer; an ethylene-unsaturated carboxylic acid copolymer base resin, such as, ethylene-methyl acrylate copolymer, an ethylene-maleic anhydride copolymer, or a metal salt of an ethylene-acrylic acid copolymer (ionomer resins) such as sodium salt, zinc salt, or calcium salt; or a mixture thereof. Particularly preferred are those having a sealant layer consisting of a resin that can be easily heat-sealed with the inner layer of the container bodies consisting of a polyethylene base resin.

To the resin of the inner layer, a resin for controlling the viscosity, such as a rosin, a modified rosin, a polyterpene base resin, a styrene base resin, a cyclopentadiene base resin, an aliphatic hydrocarbon, an aromatic petroleum resin, may be added.

In a case where the cutting line is formed by using a heating means, it is preferable to use a material of the outer layer having a melting point and a softening point higher than those of the material of the inner layer in order to prevent the shape of the multilayer lid from a damage. For example, it is desirable to employ a polyethylene base resin as the material of the inner layer and employ a paper, aluminum foil, a paper or aluminum foil having a resin layer as the outer layer thereof, or a heat resistance resin such as polypropylene, a polyamide, a polycarbonate, or a polyester as the material of the outer layer.

Further, multilayer lids having a moderate interlaminar strength can be obtained by using an ethylene-unsaturated carboxylic acid copolymer base resin as the material of the inner layer and using a polypropylene, a polycarbonate, a ployamide, or an ethylene-vinyl alcohol copolymer as the material of the outer layer.

When an ethylene-unsaturated carboxylic acid copolymer is used as the inner layer (FIGS. 5, 6), the preferred whole thickness of the multilayer lid is from 100 to 1,000μ. The thickness of the inner layer is from 5 to 60μ. If it is less than 5μ, the interlaminar strength after sealing is insufficient. If it is more than 60μ, the cutting or the inner layer becomes difficult to be cut easily, causing an occasional difficulty in opening of the lid member.

The easily-openable packaging containers of the present invention, at need, may have other layers such as a seal layer inside the multilayer lid or inside the container proper, so long as the containers have the characteristics of the present invention that the multilayer lid member has a peelable layer.

In the easily-openable packaging containers of the present invention, the means for circularly peeling the inner layer of the lid member from the outer edge of said heat-seal portion to the inner edge or inner vicinity of the heat-seal portion can be provided by the following methods:

(1) a method wherein a multilayer lid member having an inner layer capable of being cut by edge effect in heat-sealed with a container body.

(2) a method wherein a multilayer lid member provided with a cutting line is heat-sealed with a container body, (3) a method wherein a multilayer lid member is heat-sealed with a container body and to the obtained packaging container is then provided a cutting line, (4) a method wherein a seal film in that a hole having the same size as the opening portion of the container body is previously made is stuck to a lid substrate, and the obtained multilayer lid member is heat-sealed with a container body, (5) a method wherein a lid substrate and a container body are heat-sealed together with a seal film having a hole that is sandwiched between them, or (6) a method wherein a lid substrate and a container body is heat-sealed with a doughnut-shaped sealing material sandwiched between them.

On the other hand, the multilayer lid of the present invention may be produced by the following methods:

(1) a method wherein a resin layer capable of being cut by edge effect is employed in a multilayer material to be the inner layer of the multilayer lids, (2) a method wherein a multilayer material is provided with a cutting line in its inner layer, or (3) a method wherein a seal film in that a hole having the same sizes as the opening portion of container propers is made is stuck to a lid substrate.

The above-mentioned multilayer materials may be produced by co-extruding materials having the above described combination able to be delaminated or by laminating a resin film, a paper, an aluminum foil, etc.

Figure 4:
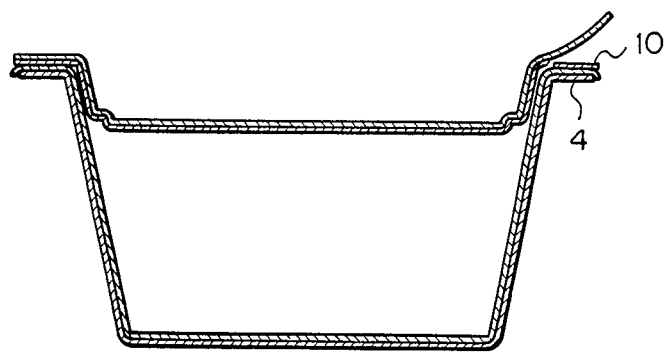
FIG. 4 is a partially sectional view illustrating a state where the easily-openable packaging container shown in FIG. 3 is being opened.

Further, the multilayer lids of the present invention may be drop (concave) lids, as shown in FIG. 3. In the drop (concave) lid shown in FIG. 3, the easily-peelable resin layer is provided by forming a notch in the inner layer of the multilayer drop (concave) lid. FIG. 4 is a sectional view illustrating a state where the multilayer drop (concave) lid shown in FIG. 3 is being peeled from a container that is produced by heat-sealing the drop (concave) lid and a container body. After delamination occurred between the lid outer layer and the easily-peelable resin layer, the inner layer of the multilayer lid is cut at the notch 6 and thus the drop (concave) lid is peeled. The easily-peelable resin layer remains adhering to the flange portion 4 of the container body. The shape of the depression in the drop (concave) lid is not to be limited so long as the depression fits into the opening portion of container bodies so as to expel air away, and it may be a curved shape, a shape having a plane bottom etc. The examples of the methods of forming the drop (concave) lids include thermo-forming such as vacuum forming and pressure forming and press forming.

The drop (concave) lids described above can provide excellent sealing property even if the contents flowed and stained and heat-seal portion, since they have excellent opening property, which permits to increase the heat-seal strength by increasing the heat-seal temperature, pressure, etc.

The container bodies of the easily-openable packaging container of the present invention is not limited in the materials, layer structure, producing method, etc. so long as a lid member can be strongly heat-sealed to them at their flange portion.

The examples of the resins to be used for the container body include polyolefin base resins, polystyrene base resins, polyamide resins, polyester base resins, ethylene-vinyl alcohol copolymers, polyacrylonitriles, polyvinylidenechlorides, resins mixed with 5 to 70% by weight of inorganic fillers, and mixtures thereof. To these resins, at need, may be blended thermoplastic elastomers, modified polyolefins modified with an unsaturated carboxylic acid or a derivative thereof, or various additives.

These resins are formed into one-layer containers or multilayer containers by means of thermo-forming of a sheet, injection molding, blow molding, injection-blow molding, etc. The material of the container bodies may be, in addition to resins, a metal such as aluminum or iron, a paper, etc. However, such containers are usually made into a multilayer container that has an heat-fusible inner layer containing, for example, a resin modified with an unsaturated carboxylic acid or a derivative thereof. Herein, the metals may also be a vapour-deposited layer.

When the easily-openable packaging containers of the present invention is provided with a heat-nonfusible layer on the inner layer of the multilayer lid member or the container body, the material of the heat-nonfusible layer is not particularly limited as mentioned above, and it is usually a thermoplastic resin having a high melting point or a thermosetting resin. The examples of such resins which may be used include polyamide resins, polyester resins, polyamide-pyroxyline copolymers, pyroxyline-silicone resin copolymers, silicone resins, urethane resins, aminoalkyd resins, and waxes, and the thickness of preferably about 1 to 15 μm. The heat-nonfusible layer is formed by application, printing, particularly gravure, or adhesion.

The easily-openable packaging containers of the present invention can be easily opened by the following simple operations.

For example, in FIG. 1 delamination of the multilayer lid member between the inner layer 2 and the outer layer 1 begins at the cutting line 7 by lifting the picking portion 8 upward, and the delamination proceeds to the cutting line 6. The peeled inner layer of the multilayer lid is then cut the cutting line 6 resulting in the peeling of the multilayer lid. Since the cutting line 6 is provided to the inner layer of the multilayer lid above the flange portion 4, the residual portion of the inner layer of the multilayer lid remained on the container body does not project inside the flange portion, and the opened container can be used comfortably.

Also, according to this invention, there can be further provided easily-openable packaging containers having so excellent heat resistance as to tolerate boiling or retort treatment and giving comfortable feelings when they are used after opening, since the lid members of the easily-openable packaging containers of the present invention can be peeled even if the heat-seal strength is increased.

The easily-openable packaging containers produced by using the seal ring shown in FIG. 7 are more advantageous since the length of t and the peeling starting position in the outer periphery is uniformly adjusted resulting in more easily openability.

The multilayer lid members can be peeled regardless to the shape of the container bodies such as rib or curl.

According to the present invention, there are provided easily-openable packaging containers having excellent properties that they have high sealing strength and excellent sealing property, they can be easily opened even if a rib or the like is provided to the container body and can be opened with a stable opening force, they give a comfortable feeling when they are used after they are opened, and they have so good heat resistance as to tolerate boiling or retort treatment. Further, there is no possibility of a poor sealing property since the usual control of heat-seal conditions for securing easy openability is not necessary and the heat-seal can be conducted under strong sealing conditions. Therefore, the practical value of the easily-openable packaging containers of the present invention is very large.

The following examples are presented to describe the present invention in more details, and the present invention is by no means limited by these examples.

EXAMPLES 1 TO 4

Example 1

A flanged container body (60 mm$\phi$×40 mm H) was produced from a high density polyethylene sheet by pressure thermo-forming. To the container flange portion was heat-sealed a lid member consisting of a high density polyethylene layer (inner layer, 60μ) and a resin mixture layer (80% by weight of a polypropylene and 20% by weight of a low density polyethylene) (outer layer, 140μ) and having a notch 6 formed with a heating blade, under the heat-seal conditions of temperature of 180° C., time of one second, pressure of 1.5 kg/cm$^2$ so that t of 2 mm was obtained.

When the multilayer lid member was peeled from thus produced container, delamination occurred in the multilayer lid member, then the inner layer of the lid member was cut at the cutting line, and thus the container was easily opened. When the container was boiled at 90° C. for 30 minutes, it remained unchanged.

Example 2

A flanged container body (60 mm$\phi$×40 mm H) was produced from a high density polyethylene sheet by pressure thermo-forming. To the container flange portion was heat-sealed a drop (concave) lid having a shape shown in FIG. 3, and consisting of a high density polyethylene layer (inner layer, 60μ) and a resin mixture layer (80% by weight of a polypropylene and 20% by weight of a low density polyethylene) (outer layer, 140μ) and having a notch 6 formed with a heating blade at the inner side of the heat-seal portion, under the heat-seal conditions of temperature of 180° C., time of one second, and pressure of 1.5 kg/cm$^2$ so that t of 2 mm was obtained.

When the drop lid was peeled from thus produced container, delamination occurred in the multilayer drop (concave) lid, then the inner layer of the drop (concave) lid was cut at the notch, and thus the container was easily opened. Also, the opening force was stable.

Example 3

A flange container body (60 mm$\phi$×40 mm H) was produced from a polypropylene sheet (800μ) by pressure thermo-forming. To the container flange portion was heat-sealed a drop (concave) lid having a shape shown in FIG. 3, and consisting of a polypropylene modified with maleic anhydride layer (inner layer, 60μ) and an aluminum sheet (outer layer, 80μ) and having a notch 6 formed with a heating blade at the inner side of the heat-seal portion, under the heat-seal conditions of temperature of 210° C., time of 2 seconds, and pressure of 10 kg/cm$^2$, so that t of 2 mm was obtained.

When the drop (concave) lid was peeled from thus produced container, delamination occurred in the multilayer lid, then the inner layer of the lid was cut at the notch, and thus the container was easily opened. Also, the opening force was stable.

Example 4

In this Example, an ethylene-unsaturated carboxylic acid copolymer was used as the inner layer of the multilayer lid member, and heat-seal was carried out without forming a cutting line to the inner layer.

Drop (concave) lid members having the structures shown in Table and container bodies of the materials shown in Table (pressure thermo-formed container body, 60 mmφ×40 mm H) were heat-sealed under the heat-seal conditions of temperature of 170° C., time of one second, and pressure of 4 kg/cm².

The seal properties of the obtained containers are shown in Table.

The containers of No. 1 to 7 excelled in all seal properties (sensory tests). After they were boiled at 90° C. for 30 minutes, they remained unchanged in all properties. Concerning No. 8 to 11, they could not satisfy all the sealing properties.

The abbreviations in Table have the following means respectively.

HDPE: High density polyethylene
PS: Polystyrene
PP: Polypropylene
EVA: Ethylene-vinyl acetate copolymer base hot-melt adhesive resin, HIRODAIN #7571 (Hirodain Industry Co., Ltd.)
Ionomer: SARLIN #1652 (E. I. du Pont de Nemours and Co.)
PE: Low density polyethylene
PET: Polyethyleneterephthalate

TABLE

| No. | 1 | 2 | 3 | 4 | 5 | 6 | 7 | 8 | 9 | 10 | 11 |
|---|---|---|---|---|---|---|---|---|---|---|---|
| Lid member | | | | | | | | | | | |
| Type | Drop lid | Drop lid | Drop lid | Drop lid | Drop lid | Drop lid | Film | Drop lid | Drop lid | Drop lid | Drop lid |
| Producing method | A | A | B | B | B | B | B | B | A | B | B |
| Thickness μ | 220 | 320 | 220 | 220 | 220 | 220 | 100 | 220 | 220 | 220 | 220 |
| Structure of lid member | | | | | | | | | | | |
| Thickness of the outer layer μ | PP 200 | PP 300 | PP 200 | PET 200 | PET 200 | PP 200 | PP 80 | PP 180 | PP 200 | PP 200 | PET 200 |
| Thickness of the medium layer μ | — | — | — | — | — | — | — | PE 20 | — | — | PE 20 |
| Thickness of the inner layer μ | 20 (EVA) | 20 (EVA) | 20 (EVA) | 20 (EVA) | 20 (IONOMER) | 20 (EVA) | 20 (EVA) | 20 (EVA) | 20 (EVA) | 20 (PP base sealant) | 20 (EVA) |
| Container proper | | | | | | | | | | | |
| Material | HDPE | HDPE | HDPE | HDPE | HDPE | PS | HDPE | HDPE | PP | PP | PP |
| Seal properties of container | | | | | | | | | | | |
| Sealing property | ⊚ | ⊚ | ⊚ | ⊚ | ⊚ | ⊚ | ⊚ | O | × | O | × |
| Openability | ⊚ | ⊚ | ⊚ | ⊚ | ⊚ | ⊚ | ⊚ | × | O | △ | ⊚ |
| Low temperature sealability | O | O | O | O | O | O | O | O | O | × | O |
| Melting of lid substrate | O | O | O | O | O | O | O | O | O | × | O |

A: Co-extrusion
B: Extruding lamination

What is claimed is:

1. An easily-openable packaging container comprising a container body having a flat flange portion and a multilayer lid member heat-sealed to the flange portion of said container body; said multilayer lid member having an interlaminar strength smaller than the adhesion strength exhibited between said flange portion and an inner layer of said multilayer lid member at a heat-seal portion formed between the flange portion and the inner layer so that said multilayer lid member can be delaminated at a portion corresponding to the heat-seal portion during opening of the container, and a cutting line being provided in said inner layer of said multilayer lid member at an inner vicinity of said heat-seal portion and spaced from said heat-seal portion for promoting circular peeling of said inner layer of said multilayer lid member from an outer edge of said heat-seal portion to the inner vicinity of said heat-seal portion; a space between said cutting line and an inner edge of the heat-seal portion being 1 to 10 mm.

2. The easily-openable packaging container as claimed in claim 1, wherein the adhesion strength between the flat flange portion of the container body and the inner layer of the multilayer lid member is not less than 1.5 kg/15 mm.

3. The easily-openable packaging container as claimed in claim 2, wherein the interlaminar strength of the multilayer lid member is not more than 1 kg/15 mm.

4. The easily-openable packaging container as claimed in claim 1, wherein the multilayer lid member is a drop (concave) lid.

5. The easily-openable packaging container as claimed in claim 1 further comprising a portion of the multilayer lid member protruding from the outer edge of the heat-seal portion to form a picking portion and another cutting line being provided in the inner layer of the multilayer lid member between said picking portion and said heat-seal portion.

6. The easily-openable packaging container as claimed in claim 1, wherein the inner layer is a resin layer and a layer adjacent to the inner layer is a metal layer, a paper layer or a resin layer having a melting point or a softening point higher than that of the inner layer resin.

7. A multilayer lid comprising a circular easily-peelable resin layer at a position where a heat-seal with a container body is to be formed, said circular easily-peelable resin layer being provided by a circular notch circling in an inner surface resin layer of said multilayer lid inside of a portion to form the heat-seal and by a layer of the lid adjacent to the inner surface layer being a metal layer or a paper layer; the interlaminar strength of said lid being smaller than the adhesion strength of the heat-seal.

8. The multilayer lid as claimed in claim 7, wherein the multilayer lid is a drop (concave) lid.

9. The multilayer lid as claimed in claim 7, wherein the inner surface resin layer of the multilayer lid is a polyethylene base resin.

10. The multilayer lid as claimed in claim 7, wherein the inner surface resin layer of the multilayer lid is an ethylene unsaturated carboxylic acid copolymer resin.

11. The multilayer lid as claimed in claim 7, wherein said inner surface resin layer has a non heat-seal portion located between the portion to form the heat-seal and the circular notch.

* * * * *